United States Patent
Kim (10) Patent No.: US 11,448,509 B1
(45) Date of Patent: Sep. 20, 2022

(54) SYSTEM AND METHOD FOR FACILITATING LIMITED AREA GPS

(71) Applicant: Yoon Phil Kim, Wayland, MA (US)

(72) Inventor: Yoon Phil Kim, Wayland, MA (US)

(73) Assignee: Yoon Phil Kim, Wayland, MA (US)

( * ) Notice: Subject to any disclaimer, the term of this patent is extended or adjusted under 35 U.S.C. 154(b) by 928 days.

(21) Appl. No.: 16/231,444

(22) Filed: Dec. 22, 2018

(51) Int. Cl.
*G01C 21/20* (2006.01)
*H04W 4/02* (2018.01)
*G01S 19/13* (2010.01)

(52) U.S. Cl.
CPC ............ *G01C 21/206* (2013.01); *G01S 19/13* (2013.01); *H04W 4/02* (2013.01)

(58) Field of Classification Search
CPC ... G01S 19/13; G01S 1/44; G01S 1/70; G01S 5/02; G01S 5/16; G01S 13/878; G01S 17/87; H04W 4/02
USPC ......................................................... 702/150
See application file for complete search history.

(56) References Cited

U.S. PATENT DOCUMENTS

| | | | | |
|---|---|---|---|---|
| 5,491,670 A | * | 2/1996 | Weber | G05D 1/0255 367/128 |
| 9,703,002 B1 | * | 7/2017 | Olsson | H01M 10/613 |
| 2005/0282558 A1 | * | 12/2005 | Choi | G01S 13/878 455/456.1 |
| 2013/0063307 A1 | * | 3/2013 | Krasner | G01S 19/11 342/387 |
| 2013/0084889 A1 | * | 4/2013 | Schmitt | G01S 1/68 455/456.1 |

* cited by examiner

*Primary Examiner* — John H Le
(74) *Attorney, Agent, or Firm* — Park & Associates IP Law, P.C.

(57) ABSTRACT

Disclosed are a system for identifying the position of mobile object, comprising a positioning module, a set of beacons and processor configured to determine the position of the positioning module based on the data gathered from the interaction between the positioning module and each one of the set of beacons. More specifically, the limited area positioning system utilizes signal emitted from the positioning module and the signals emitted from the each of the beacons in response to the signal from the positioning module. Using the signals transmitted from the positioning module and the beacons, at least three circles can be formed, and the limited area positioning system determines the intersecting point of those three circles as the position of the positioning module.

5 Claims, 10 Drawing Sheets

SYSTEM AND METHOD FOR FACILITATING LIMITED AREA GPS

FIELD OF THE INVENTION

The invention relates to a position system and method within limited area, and more particularly relates to an indoor positioning and posture measurement system based on directional and non-directional signal scanning and measurement method.

BACKGROUND OF THE INVENTION

Various known navigation and positioning systems enable people in cars, boats, aircraft, and other moveable objects to efficiently travel between given locations. Knowing a precise current geographic location or starting location and a desired destination or ending location enables navigation systems to provide customized directions that indicate which direction that moveable object should travel to reach the destination or ending location. Various known navigation systems use path-planning algorithms that combine knowledge of conduits (such as streets, bridges, or traffic rules), obstacles (such as freeway congestion), and current real-time positioning information to determine and output detailed directions.

Various known navigation systems are enhanced through graphical user interfaces that visually depict the surroundings of a current position, identify points of interest, and provide a highlight of a path of travel to reach a destination. In one known example, vehicular navigation systems use the Global Positioning System (widely known as GPS). GPS is a space-based global navigation satellite system (GNSS) that provides reliable location and time information to anyone on or near the Earth.

One known limitation of existing navigation systems that employ GPS is that they typically need an unobstructed line of sight to multiple (such as four or more) GPS satellites to receive and calculate a geographic position of an object. For this reason, GPS typically does not effectively operate in indoor areas or spaces such as in buildings or other covered structures. Thus, while GPS has become a valued system for outdoor navigation, GPS is generally unsuited for indoor navigation.

Various existing indoor navigation systems use radio or sound waves to determine a current position of a moveable object in an indoor area. One known indoor navigation system determines a location using Received Signal Strength Indicator ("RSSI") values of multiple Wi-Fi beacons (i.e., IEEE 802.11 access points or radios). This system is configured to use location fingerprinting, which stores samples of RSSI values of received Wi-Fi signals transmitted by a number of locations in a mapped area. In this location fingerprinting system, a processor computes a current location of a moveable object by sampling the RSSI values and performing a look-up within a database.

Another known indoor navigation system determines a location of a moveable object using triangulation of RSSI values of multiple Wi-Fi beacons. This system uses triangulation to compute expected signal strengths at a given location using signal propagation equations that estimate effects of known obstructions and multipath errors.

One known problem of using location fingerprinting or triangulation in indoor areas is that both of these methods are limited in accuracy to within a few meters, and tend to worsen with dynamic changes in signal obstructions resulting from human movement or physical obstructions including, for example, walls, shelves, signs, etc. Similar methods using Bluetooth or Near Field Communication ("NFC") signals also experience the same challenges in indoor areas.

Since all of these indoor navigation systems have various known issues or problems, the overall need for indoor navigation systems remains an issue largely unaddressed by currently known commercially available navigation systems. Accordingly, a need exists for better indoor navigation systems.

SUMMARY OF THE INVENTION

Accordingly, example embodiments of the present disclosure are provided to substantially obviate one or more problems due to limitations and disadvantages of the related art. Various embodiments of the present disclosure solve the above problems by providing a precise and accurate limited area positioning system that utilizes distances and/or angles between the positioning module and a set of beacons.

Generally, a limited area positioning system includes a positioning module, at least three beacons and a processor that is configured to determine the position of the positioning module based on the data gathered from the interaction between the positioning module and each one of the set of beacons. More specifically, the limited area positioning system utilizes signal emitted from the positioning module and the signals emitted from the each of the beacons in response to the signal from the positioning module. Using the signals transmitted from the positioning module and the beacons, at least three circles can be formed, and the limited area positioning system determines the intersecting point of those three circles as the position of the positioning module.

One aspect of the present disclosure provides systems for self-positioning within a limited area. Example embodiments provided in the present disclosure, as limited area positioning system, provide systems for determining position of a positioning module based on a set of distance between the positioning module and the set of beacons. Other example embodiments of the present disclosure, as limited area positioning system, provide systems for determining position of a positioning module based on a set of angles between two different beacons among a set of three beacons.

In one embodiment, the limited area positioning system comprises a positioning module, at least three beacons, and a processor configured to define three theoretical circles and to identify the intersecting point of the three theoretical circles. The positioning module is provided with a signal transmitter to emit a module signal and one or more beacon signal receiver to receive one or more beacons signals emitted from each one of the beacons. Each one of the beacons comprises a module signal receiver and one or more beacon signal transmitters. The processor is configured to define at least three circles, and identify the intersecting point of those three circles as the current position of the positioning module. In this embodiment, each circle is defined around each one of the distinct beacons. The coordinates of each of the beacons are predefined. Therefore, a circle around a beacon can be defined when the radius of the circle is known. In other words, each one of the beacons acts as the center of the circle defined around that beacon, and the distance between the beacon at the center of the circle and the positioning module is the circle's radius. To obtain the distance between beacon and the positioning module, each beacon emits at least two different types of beacon signals in response to the module signal emitted from the positioning module, and the difference in the time of arrival of the two different types of signals received by the beacon signal receiver of the positioning module is used. The process for obtaining distance between the beacon and the positioning module repeats until the processor identifies an intersecting point of at least three circles.

In some embodiments, said two different types of beacon signal include two different radio frequency signals, each having a different wavelength from each other. That is, each beacon can emit a first radio frequency signal of a first wavelength and a second radio frequency of a second wavelength. In some other embodiments, said two different types of beacon signal include a radio frequency signal and an acoustic signal, such as ultrasonic signal. In either embodiment, at least one of the two different types of beacon signals must be unique in comparison to the beacon signals emitted from other beacons so that the distance from the positioning module to a particular beacon can be identified. Also, in either embodiment, the difference between the two beacon signals emitted from the beacon must be significant enough to exhibit the time of arrival difference identifiable by the beacon signal receiver of the positioning module.

In another embodiment, the limited area positioning system comprises a positioning module equipped with a module signal transmitter, an actuator for adjusting the direction of the module signal emitted from the module signal transmitter, at least three beacons, and a processor configured to define three theoretical circles and to identify the intersecting point of the three theoretical circles. The positioning module is provided with a signal transmitter to emit a module signal and one or more beacon signal receiver to receive one or more beacons signals emitted from each one of the beacons. The module signal emitted from the module signal transmitter has directionality. In other words, the module signal is configured to travel in a limited range of directions. Accordingly, the system is further provided with an actuator for adjusting the direction of the module signal emitted from the module signal transmitter. Each one of the beacons comprises a module signal receiver and one or more beacon signal transmitters. The processor is configured to define at least three circles, and identify the intersecting point of those three circles as the current position of the positioning module.

In this embodiment, each circle is defined by the angle formed between two distinct beacons and the positioning module as the vertex. The actuator is configured to adjust module signal transmitter of the positioning module until the module signal is received by the module signal receiver of the first one of the beacons. In response to receiving the module signal, the first beacon transmits one or more beacon signals, and the processor records the position of the actuator when said one or more beacon signals are received at the beacon signal receiver of the module. The actuator continues to adjust the module signal transmitter of the positioning module until the module signal is received by the module signal receiver of the second one of the beacons. In response to receiving the module signal, the second beacon transmits one or more beacon signals, and the processor records the position of the actuator when said one or more beacon signals are received at the beacon signal receiver of the module. The actuator continues to adjust the module signal transmitter of the positioning module until the module signal is received by the module signal receiver of the third one of the beacons. In response to receiving the module signal, the second beacon transmits one or more beacon signals, and the processor records the position of the actuator when said one or more beacon signals are received at the beacon signal receiver of the module. The first angle between the first two set of beacons can be identified from the recorded positions of the actuator. There are several other vertices that can form the same angle between the first two set of beacons, and the first circle can be defined by connecting these vertices and the first two set of beacons. Likewise, the second angle between the second two set of beacons can be identified from the recorded position of the actuator. There are several other vertices that can form the same angle between the second two set of beacons, and the second circle can be defined by connecting these vertices and the second two set of beacons. Lastly, the third angle between the third two set of beacons can be identified from the recorded position of the actuator. There are several other vertices that can form the same angle between the third two set of beacons, and the third circle can be defined by connecting these vertices and the third two set of beacons. The intersecting point of the foregoing three defined circles is identified as the position of the positioning module. The coordinates of each of the beacons are predefined. Also, a hash map of angles and coordinates of the corresponding intersecting point of the circles formed by the angles are pre-calculated and stored in a database (look-up table). Accordingly, the processor can identify the coordinate of the positioning module by querying the set of three angles to the pre-stored database.

Another aspect of the present disclosure provides a method for self-positioning within a limited area. Example embodiments provided in the present disclosure, as methods for self-positioning within a limited area, provide methods for determining position of a positioning module based on a set of distance between the positioning module and the set of beacons. Other example embodiments of the present disclosure, as methods for self-positioning within a limited area, provide methods for determining position of a positioning module based on a set of angles between two different beacons among a set of three beacons.

The method for self-positioning within a limited area may simultaneously or sequentially use a combination of distance based positioning method and angle based positioning method to determine a specific location, orientation, and movement of a moveable object within a limited area or space. Likewise, the positioning system can be configured to simultaneously or sequentially use a combination of distance based positioning method and angle based positioning method to determine a specific location, orientation, and movement of a moveable object within a limited area or space.

DETAILED DESCRIPTION OF THE INVENTION

Hereinafter, the present invention will be described in more detail with reference to the following Examples. However, these Examples are set forth to illustrate the present invention, and the scope of the present invention is not limited thereto.

Figure 1:
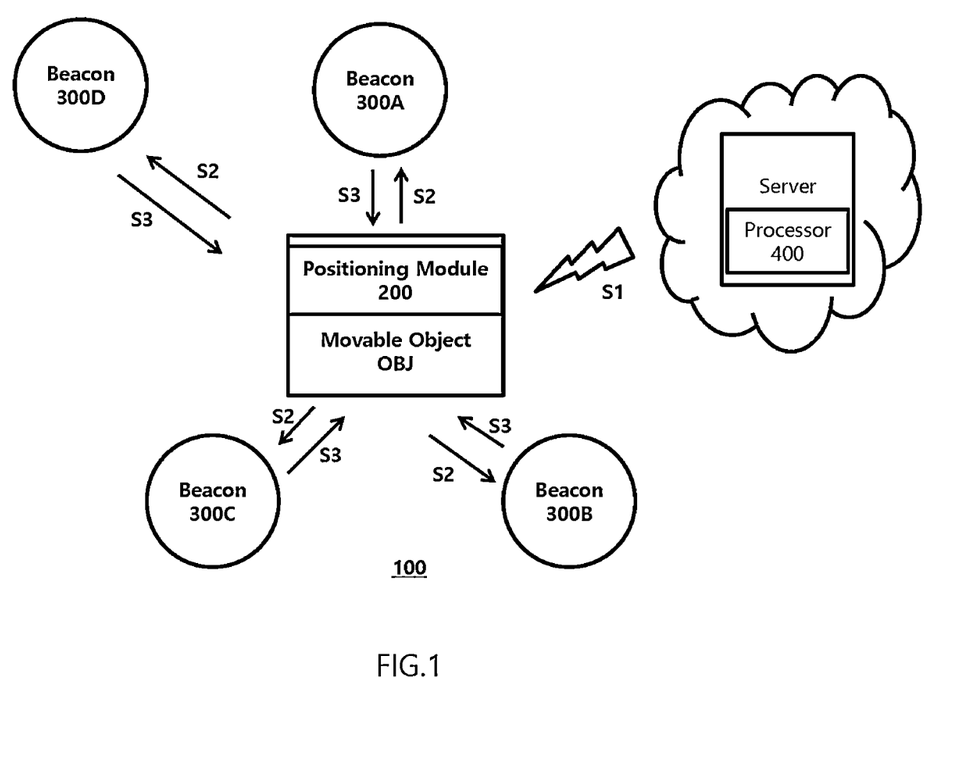
FIG. 1 is a functional schematic diagram of a limited area positioning system of one example embodiment of the present disclosure.

Turning now to the drawing, FIG. 1 shows a functional schematic diagram of one embodiment of a limited area positioning system 100 of the present disclosure that accurately and precisely determines a current location of a movable object OBJ in an indoor area. In this disclosure, the limited area can be any suitable indoor area such as, but not limited to, a retail or wholesale store (such as a grocery store), a megastore, a shopping mall, a museum, a school, a hospital, an office building, a residential building, an indoor amusement park, and a storage warehouse. In addition, the limited area may also be certain partially enclosed or restricted outdoor areas (e.g., urban canyons, college campuses, railway stations, etc.), which certain mobile devices may have difficulties in reliably receiving or acquiring sufficient satellite or cellular wireless signals to facilitate or support one or more conventional satellite signal dependent position estimation techniques. Being in a near enclosed space, such as a steep sided valley or a high rise urban environment, reduces the area of sky visible to the GPS receiver. In such situations, the number of satellites that are in direct line of site of the receiver is reduced. Also, receiving GPS signals from a disperse set of satellites is prevented. That is, the satellites used to calculate your location are clustered within a small area of the sky. Highly clustered satellites can result in large positional errors, even up to several hundred meters. Unlike the conventional satellite based GPS, the limited area positioning system 100 described in the present disclosure offers millimeter scale accuracy in near closed environment or even indoors.

For instance, in a shopping mall or grocery store environment, the limited area positioning system 100 can provide assistance to customers in locating their desired items within the store. In this embodiment, the movable object OBJ could be a cart that can move around within the store or a device that is carried by a user. The movable object OBJ can be equipped with a means to display to a user the location where the supplies are stocked and help users to navigate toward the designation. The limited area positioning system 100 can also show a navigation route or turn-by-turn directions to areas of the shopping mall or the grocery store where the desired items are located. The limited area positioning system 100 can also track when the user puts the desired items from the shelf to the cart at a location and update the navigation route or directions within the limited area (e.g., shopping mall or grocery store). For instance, the limited area positioning system 100 may be configured to scan the RFID of the item when the movable object OBJ (e.g., cart) reaches the shelf where the item is at.

In another embodiment, the limited area positioning system 100 could be used to guide users through a museum. In this embodiment, the limited area positioning system 100 displays a navigation route or turn-by-turn directions to different exhibits in a museum. The limited area positioning system 100 can also enable a user to search for a particular exhibit and display a navigation route or directions to reach the exhibit. The limited area positioning system 100 can also display more information about the exhibit when it detects the user is in proximity to an exhibit.

In yet another embodiment, the limited area positioning system 100 can be used to navigate an autonomous cleaning machine within the limited area. In this embodiment, the movable object OBJ could be an autonomous cleaning robot that cleans the floor of the limited area. Of course, the movable object OBJ is not limited to a vacuum robot, but may also be lawnmower, air purifier or any other machine, which features automatic maneuvering ability within a limited area.

In the illustrated exemplary embodiments, the limited area positioning system 100 generally includes a positioning module 200, a set of beacons 300A-300D, and a processing system 400. The positioning module 200 is configured to communicate with the set of beacons 300A-300D and identify its position in relation to the position of the set of beacons. Each of the beacons is configured to detect the positioning module 200 that is within certain perimeter in the limited area. The processor 400 is configured to communicate with the positioning module 200 and the beacons 300A-300D, and processes data retrieved at the positioning module 200 and the beacons 300A-300D to provide the position of the positioning module 200 in relation to the beacons 300A-300D.

Each of the beacons 300A-300D is placed at a specific position around the limited area. There are only four beacons 300A-300D are depicted in the examples disclosed herein for convenience of explanation. However, it should be noted that additional beacons can be placed as needed to cover a larger area and to increase the positioning accuracy. The limited area positioning system 100 of the present disclosure requires the positioning module 200 to be in communication with minimum of three beacons 300 to determine the position of the positioning module 200. In a sense, a set of three beacons, which is in communication with the positioning module 200, defines a block within the limited area, where the position of the positioning module 200 can be found. Accordingly, the beacons 300 should be positioned around the limited area to maximize the area covered by each set of three beacons 300, and at the same time, minimize the area where the positioning module 200 cannot communicate with at least three beacons 300.

The positioning of the beacons 300 may vary based on the type of signals used by the positioning module 200 in communicating with the beacons 200. In some embodiments, the positioning module 200 and the beacons 300 communicate with signals that penetrate through a wall or other obstruction. In such embodiments, beacons should be positioned in a close proximity to each other so that the signals from/to the positioning module 200 can reach and maintain communication with at least three beacons 300. If one of the beacons is positioned too far away from the positioning module 200 and cannot communicate with the positioning module 200, then the positioning system 100 would not be able to determine the position of the positioning module 200 within the limited area. As will be described in further detail, some embodiments of the positioning system 100 use the relative angle between the positioning module 200 and three sets of two different beacons 300. In such embodiments, the signals between the positioning module 200 and the beacons 300 may require direct line of sight, and thus the area where the positioning module 200 can determine its position may be limited to the area that provides clear line of sight from the positioning module 200 to at least three of the beacons so that relative angle between the positioning module 200 and each set of two beacons among the three beacons can be measured. In this disclosure, those areas where the positioning module 200 cannot communicate with at least three distinct beacons 300 is referred to as the dead spot.

The positioning module 200 may be coupled to the movable object OBJ, or in some embodiments, the positioning module 200 may be a part of the movable object OBJ. Accordingly, the position of the positioning module 200 changes as the movable object OBJ moves within the limited area. The positioning module 200 is configured to emit a module signal S2 upon receiving an activation signal S1. The activation signal S1 can be provided from the processor 400 periodically or on an occurrence of a predefined triggering event. For instance, the processor 400 may be configured to provide the activation signal S1 every 10 seconds, every 10 meters of movement by the movable object OBJ or when a sensor that monitors the movable object OBJ measures changes to or in the movable object OBJ (e.g., physical impact is sensed by the movable object OBJ). The activation signal S1 activates the positioning module 200 to emit the module signal S2. The module signal S2 is, in a sense, serves as an activation signal that initiates operation of the beacons 300. That is, the beacons 300 are configured to emit one or more types of beacon signals S3 when it receives the module signal S2 from the positioning module 200. The processor 400 is configured to determine the current position of the positioning module 200 when the beacon signals S3 emitted from at least three of the distinct beacons 300 are received by the positioning module 200.

As shown in FIG. 1, the processing system 400 may be a standalone processing system that is provided on a separate network server, which is configured to communicate with the positioning module 200 and the set of beacons 300A-300D via various networking means, such as the Internet. As will be described in further detail below, in some embodiments, the processing system 400 may be integrated with the positioning module 200 or may be integrated with one or more beacons 300A-300D. In other words, the processing system 400 is not limited to a single central processing system, but may be provided in some or all of the elements implementing the limited area positioning system 100.

Figure 2:
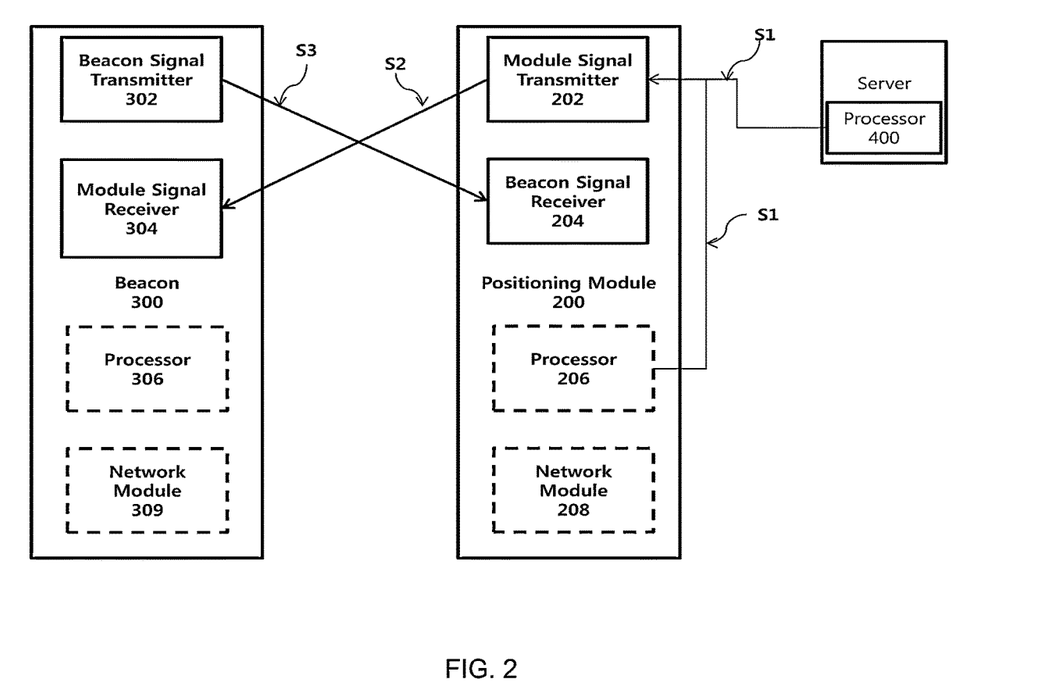
FIG. 2 is a block diagram showing an exemplary embodiment of a positioning module and an exemplary embodiment of a beacon.

FIG. 2 is a schematic diagram of an exemplary positioning module 200 and a beacon 300 in an embodiment of the positioning system 100. The positioning module 200 includes a module signal transmitter 202 and a beacon signal receiver 204. The module signal transmitter 202 may be a transmitter that transmits a longitudinal wave signal (e.g., acoustic signals) and/or a transverse wave signal (e.g., electromagnetic signals). In some embodiments of the present disclosure, the module signal transmitter 202 may be a transmitter that transmits a signal that radiates without a specific directionality, for instance, a radio frequency signal transmitter. In some other embodiments, the module signal transmitter 202 may be a transmitter that emits a signal exhibiting directionality, such as a laser or an infrared based signal. As mentioned above, the module signal transmitter 202 emits a module signal S2 upon receiving an activation signal S1 from the processor 400.

The beacon signal receiver 204, as its name implies, is configured to receive at least two different types of beacon signals S3 emitted from the beacon 300. The beacon 300 is configured to at least two different types of beacon signals S3 upon receiving the module signal S2 emitted from the positioning module 200. In some embodiments, the beacon 300 may be configured to emit a first radio frequency signal and a second radio frequency signal, each having a different frequency from each other. In such embodiments, the beacon signal receiver 204 can be a radio frequency signal receiver. In some embodiments of the positioning system 100, each beacon 300 is configured to emit two different kinds of beacon signals S3, for instance, as electromagnetic signal and acoustic signal. For instance, each beacon 300 may be configured to emit a radio frequency signal and an ultrasonic wave signal as the two different types of beacons signals S3. In such embodiments, the beacon signal receiver 204 may include a plurality of signal receivers compatible with the different kinds of signals emitted from the beacons 300.

In the exemplary positioning module 200 depicted in FIG. 2, the positioning module 200 is equipped with a processor 206. The on-board processor 206 may be configured to provide the activation signal S1 to the module signal transmitter 202. However, as mentioned above, the activation signal S1 may be provided by the processor 400, which may be provided on a separate standalone server communicating with the positioning module 200 via a network. Accordingly, the positioning module 200 may be equipped with a network module 208, which allows the positioning module 200 to communicate with the processor 400 provided on a network server and with beacons 300, if needed, using one or more wireless communication network. The wireless communication network may include, for example, second generation mobile communication networks such as Global System for Mobile communication (GSM), Code Division Multiple Access (CDMA), etc., a mobile internet such as Bluetooth, Wireless Fidelity (Wi-Fi), third generation mobile communication networks such as Wideband Code Division Multiple Access (WCDMA), CDMA2000, etc., fourth generation mobile communication networks such as Long Term Evolution (LTE), LTE-Advanced, and 5th generation mobile communication networks.

As shown in FIG. 2, each of the beacons 300 includes a beacon signal transmitter 302 and a module signal receiver 304. As mentioned above, the beacon 300 is configured to at least two different types of beacon signals S3 upon receiving the module signal S2 emitted from the positioning module 200. In some embodiments of the present disclosure, the beacon signal transmitter 302 may be radio frequency signal transmitter. In such embodiments, the beacon signal transmitter 302 emits a first radio frequency signal with a first frequency and a second radio frequency signal with a second frequency. The beacon signal transmitter 302 can be configured to emit the first radio frequency and the second radio frequency in an order. Alternatively, two different radio frequency signals may be emitted simultaneously. In some other embodiments, the beacon signal transmitter 302 may be a combination of signal transmitters that emits a first type of beacon signal such as an electromagnetic signal and a second type of beacon signal such acoustic signal. As a non-limiting example, the first type beacon signal can be a radio frequency signal and the second type of beacon signal can be an ultrasonic wave signal.

As mentioned above, the beacon signal transmitter 302 emits at least two different types of beacon signals S3 (e.g., two different bands of radio frequency signals or two different kinds of signals) upon receiving the module signal S2 from the positioning module 200. In either embodiment, the positioning module 200 should be able to identify which beacon the beacon signal S3 is coming from. In other words, the positioning system 100 must be able to identify which specific beacon 300 the beacon signal S3 originates from. Accordingly, the set of beacons 300 positioned nearby each other (e.g., within a predetermined range of distance from one another) may be configured to emit beacon signals S3 that is distinguishable from the beacon signal S3 emitted from the nearby beacon 300. For instance, the radio frequency signal emitted from the first beacon 300A may be different from the radio frequencies signal emitted from the second beacon 300B and the third beacon 300C. Likewise, the radio frequency signal emitted from the second beacon 300B may be different from the radio frequency signals emitted from the first and the third beacon 300C. Of course, all of the beacons 300 forming the positioning system 100 may be configured to emit a unique radio frequency signal. Also, all of the beacons 300 may be configured to emit beacon signals S3 with beacon identification information, such as RFID. It is sufficient that every possible set of three beacons 300 around the positioning module 200 have the different radio frequency or other distinct signal characteristic to distinguish one beacon from another two beacons.

The positioning module 200 may not have capability to receive and distinguish the beacon signals S3 from multiple beacons 300 if multiple beacons 300 emit the beacon signal S3 as soon as it receives the module signal S2. In such embodiments, the set of beacons 300 receiving the module signal S2 may be configured to emit the beacon signal S3 in a certain order. By way of example, the module signal S2 emitted from the positioning module 200 may be received by four beacons 300A-300D positioned around the positioning module 200. The beacons 300A-300D may be configured to communicate with other beacons 300 of the positioning system 100 to determine which one of the beacons 300 of the positioning system 100 have received the module signal S2 from the positioning module 200. Upon identifying the set of beacons that received the module signal S2, an order can be defined among those beacons 300 so that each beacons, which received the module signal 2S, emits its beacon signal S3 in the defined order. By way of an example, beacons 300A, 300B and 300C may have received the module signal S2, and the processor 400 (or the processor 206 of the positioning module 200 or the processor 306 of the beacon 300) may control such that the beacon 300A emits the beacon signal S3 first, beacon 300B emits the beacon signal S3 in second, and beacon 300C transmit the beacon signal S3 after the positioning module confirms the receipt of the beacon signal S3 from the beacon 300B.

The module signal receiver 304, as its name implies, is configured to receive the module signal S2 emitted from the positioning module 200. In some embodiments, the module signal S2 may be a radio frequency signal, and in such cases, the beacon 300 may be provided with a radio frequency module signal receiver. Also, as mentioned above, the module signal S2 may be a signal with directionality such as laser or infrared based signal. Accordingly, the module signal receiver 304 may be a laser signal receiver or an infrared signal receiver.

In FIG. 2, the exemplary beacon 300 is equipped with a network module 308. The beacon 300 may be equipped with a network module 308, which allows the beacon 300 to communicate with the network server and/or with the positioning module 200, if needed, using one or more wireless communication network. As mentioned above, the beacons 300 may be configured to communicate with other beacons 300 and define the signaling order among the beacons before they emit the beacon signal S3. Also, the beacon 300 may communicate with the positioning module 200 and emit the beacon signal S3 when the positioning module 200 gives a signal indicating that it is ready to receive the beacon signal from that particular beacon 300. The wireless communication network may include, for example, second generation mobile communication networks such as Global System for Mobile communication (GSM), Code Division Multiple Access (CDMA), etc., a mobile internet such as Bluetooth and Wireless Fidelity (Wi-Fi), third generation mobile communication networks such as Wideband Code Division Multiple Access (WCDMA), CDMA2000, etc., fourth generation mobile communication networks such as Long Term Evolution (LTE), LTE-Advanced, and 5th generation mobile communication networks.

Figure 3A:
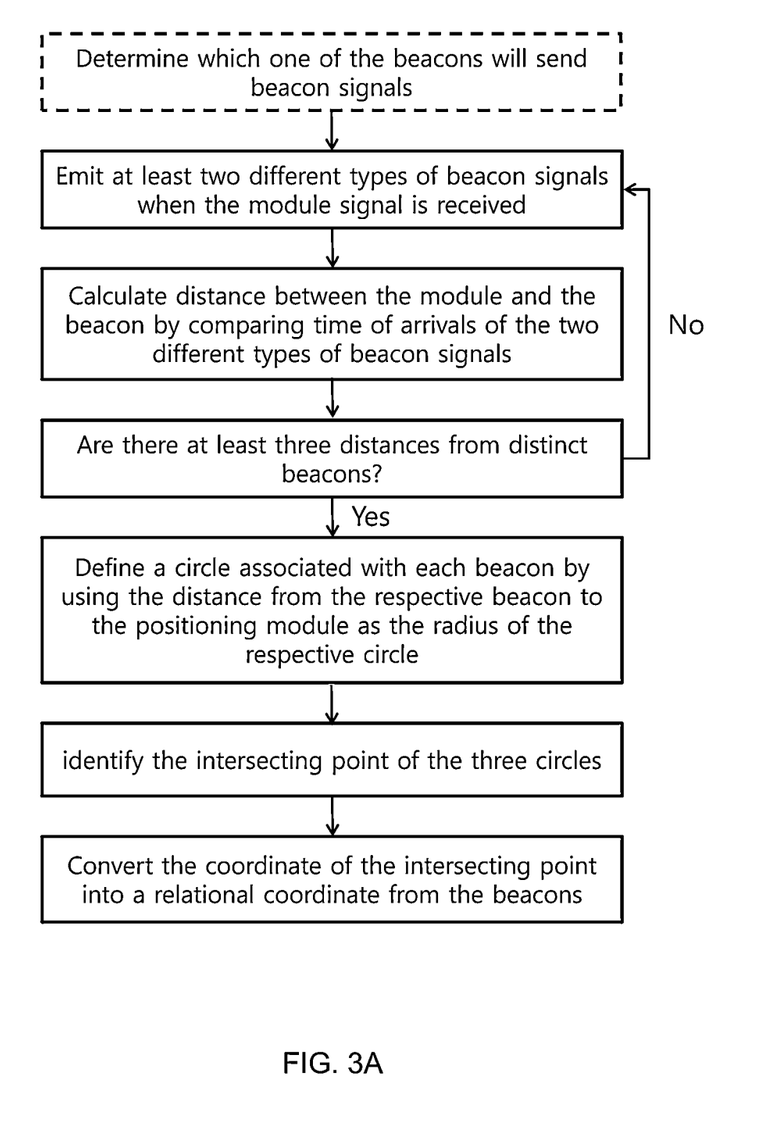
FIG. 3A is a flowchart illustrating a method of determining the position of the positioning module according to an embodiment of the present disclosure.

FIG. 3A is a flowchart representative of example machine-accessible instructions, which may be executed to identify the position of the positioning module 200 according to an embodiment of the present disclosure.

The process begins by the positioning module 200 emitting the module signal S2. In this embodiment, the module signal S2 emitted from the positioning module 200 is a signal without directionality, such as radio frequency signal. As described above, the positioning module 200 may be configured such that it emits the module signal S2 periodically or upon certain triggering event. For instance, the positioning module 200 may be configured to emit the module signal in every predetermined time frame (e.g., 5 seconds).

Depending on the location of the positioning module 200, the module signal S2 emitted from the positioning module 200 may be received by some of the beacons 300, which are placed around the area where the positioning module 200 is intended to travel. When a beacon 300 receives the module signal S2 emitted from the positioning module 200, the beacon 300 emits at least two different types of beacon signals S3.

It should be noted that the methods of determining the position of the positioning module 200 described in the present disclosure requires data from at least three beacons 300 positioned around to the positioning module 200. Accordingly, beacon signal S3 can be disregarded by the positioning module 200 until the positioning module 200 receives the beacon signals S3 from at least three distinct beacons 300. In other words, the positioning module 200 may move to another location and performs the scanning operation (i.e., emitting the module signal S2) until at least three distinct beacons 300 emit the beacon signal S3 in response to the module signal S2 from the positioning module 200. As briefly described above, in a more elaborated embodiment, the beacons 300 may be optionally configured to communicate with each other to identify how many beacons 300 have received the module signal S2 from the positioning module 200, and define the order of which beacon is to emit the beacon signals.

The positioning operation begins when the positioning module 200 receives the third beacon signal S3 at a given position. In particular, the positioning module 200 emits the module signal S2 and then prepares to receive the beacon signal S3 from the nearby beacons 300. The two different types of beacon signals S3 from the first beacon 300A may include a radio frequency signal and an ultrasonic wave signal. In such embodiments, the beacon signal receiver 204 of the positioning module 200 includes a radio frequency receiver and an ultrasonic wave signal receiver. The radio frequency signal and the ultrasonic wave signal may be emitted simultaneously from the beacon 300A, and the time of arrival of those two signals at the positioning module 200 can be recorded by the beacon signal receiver 204 of the positioning module 200. The radio frequency signal travels at the speed of light. The ultrasonic wave signal travels at the speed of sound, which is approximately 344 meters per second. Accordingly, the time of arrival for the radio frequency signal and the ultrasonic wave signal at the beacon signal receiver 204 of the positioning module 200 would be different, and the distance from the beacon 300 to the positioning module 200 can be calculated by the difference of arrival times. For instance, the formula for obtaining the distance is as follow:

Distance=(AToR−AToU)*0.344, where "AToR" denotes the arrival time of RF signal in microseconds, and "AToU" denotes the arrival time of ultrasonic in microseconds. The distance is obtainable in millimeter scale.

Figure 3B:
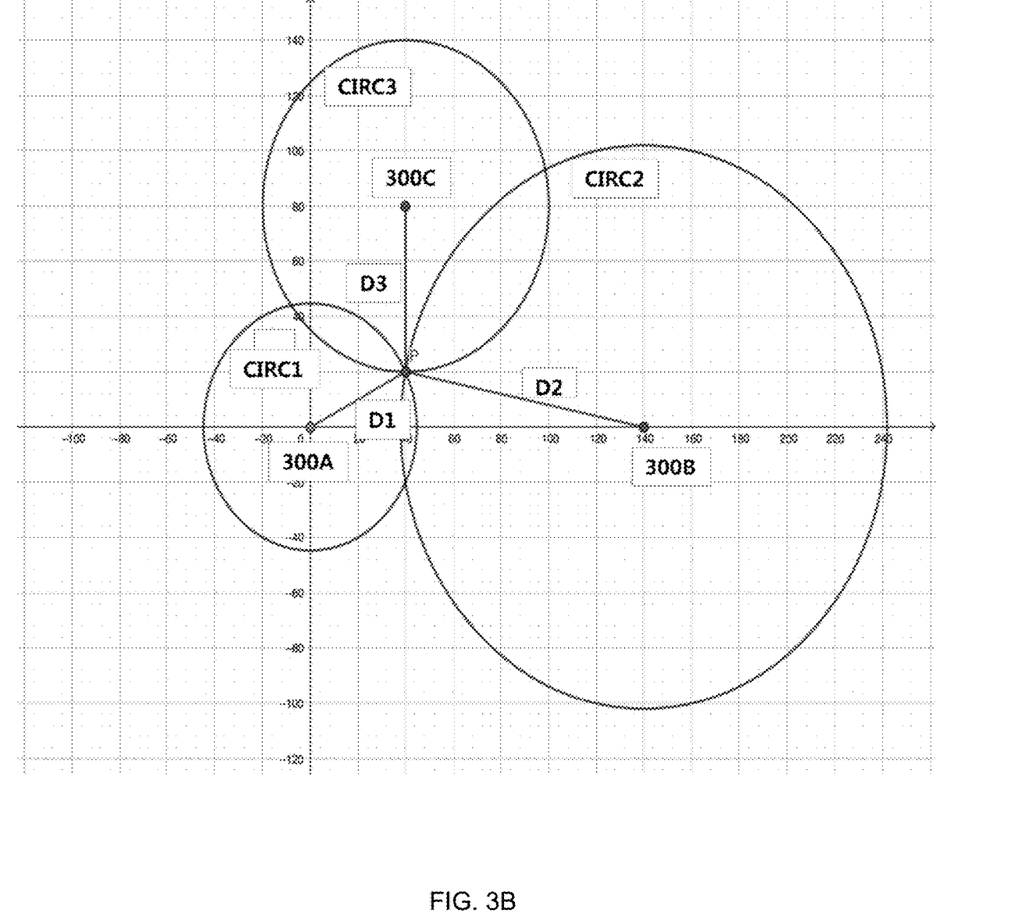
FIG. 3B is a schematic diagram illustrating a method of determining the position of the positioning module based on the distance between the positioning module and three beacons.

FIG. 3B illustrates a schematic illustration of how the exact location of the positioning module 200 can be found by using the distances from the three beacons 300A, 300B and 300C. When the module signal S2 is received, the first beacon 300A emits the two different types of the beacon signals S3. Based on the time of arrival difference at the beacon signal receiver 204 of the positioning module 200, the distance between the first beacon 300A and the positioning module 200 is identified (denoted D1) by using the foregoing formula. Although the distance D1 between the positioning module 200 and first beacon 300A is identified, the exact position of the positioning module 200 is still unknown as the positioning module 200 could be positioned at any location where that is distance D1 away from the first beacon 300A. In other words, the positioning module 200 can be at any one point on the circumference of the circle CIRC1 around the first beacon 300A, which is defined by the identified distance D1 from the beacon 300A as the radius and the beacon 300A as the center of the circle CIRC1. All of the points on the circle CIRC1 are the potential candidate for the position of the positioning module 200. Accordingly, the set of coordinates for those points on the circle CIRC1 can be prepared as a dataset.

When the module signal S2 is received, the second beacon 300B emits the two different types of the beacon signals S3. Based on the time of arrival difference at the beacon signal receiver 204 of the positioning module 200, the distance between the second beacon 300B and the positioning module 200 is identified, which is denoted D2. Similar to the case of first beacon 300A, the positioning module 200 can be at any one point on the circumference of the circle CIRC2 around the second beacon 300B, which is defined by the identified distance D2 from the second beacon 300B as the radius and the second beacon 300B as the center of the circle CIRC2. All of the points on the circle CIRC2 are the potential candidate for the position of the positioning module 200. Accordingly, the set of coordinates for those points on the circle CIRC2 can be prepared as a dataset.

When the module signal S2 is received, the third beacon 300C emits the two different types of the beacon signals S3. Based on the time of arrival difference at the beacon signal receiver 204 of the positioning module 200, the distance between the third beacon 300C and the positioning module 200 is identified, which is denoted D3. Similar to the case of first and second beacons 300A/300B, the positioning module 200 can be at any one point on the circumference of the circle CIRC3 around the third beacon 300C, which is defined by the identified distance D3 from the third beacon 300C as the radius and the third beacon 300C as the center of the circle CIRC3. All of the points on the circle CIRC3 are the potential candidate for the position of the positioning module 200. Accordingly, the set of coordinates for those points on the circle CIRC3 can be prepared as a dataset.

When the distances from the positioning module 200 to at least three beacons 300A, 300B and 300C are known, the exact position of the positioning module 200 can be determined, as the circles CIRC1, CIRC2 and CIRC3 that were defined around each of the beacons 300A, 300B and 300C respectively, by the distance to the positioning module 200 will intersect at a single point, which is where the positioning module 200 is located. In other words, the dataset comprising the set of coordinates of the points forming the first circle CIRC1, the dataset comprising the coordinates of the points forming the second circle CIRC2, and the dataset comprising the set of coordinates forming the third circle CIRC3 are compared to identify the coordinate of the point that exist in all of those datasets.

Sometimes a distance from a beacon 300 to the positioning module 200 may not be perfectly accurate due to signal noises, and there might not be an intersecting point of the three circles defined around the beacons. Accordingly, the positioning system 100 can be configured to utilize distances from additional number of beacons. Although not depicted in FIG. 3B, the positioning module 200 can make use of the beacon signals emitted from additional numbers of beacons, for instance, fourth and fifth beacons. In such a case, the fourth and fifth circles can be defined by the beacon signals emitted from those additional beacons, and it will increase the chance of identifying the point where at least three circles intersect, which will be identified as the current position of the positioning module 200.

Although the foregoing example described in reference to FIGS. 3A and 3B utilizes the time of arrival difference between a radio frequency signal and an ultrasonic wave signal, the two different types of the beacon signals are not limited to the radio frequency signal and the ultrasonic wave signal. As such, in some other embodiments, the two different types of beacon signals may be another type of electromagnetic signal and another type of acoustic wave signal that are capable of exhibiting distinguishable time of arrival at the beacon signal receiver 204 of the positioning module 200. For instance, the first type of the beacon signal S3 can be a light signal (e.g., infrared, laser, visible, ultraviolet) and the second type of the beacon signal S3 can be a sound based signal. It is sufficient that the two different types of the beacon signals S3 have different characteristics so that there is a meaningful difference in the time of arrival at the positioning module 200 can be identified.

Figure 4:
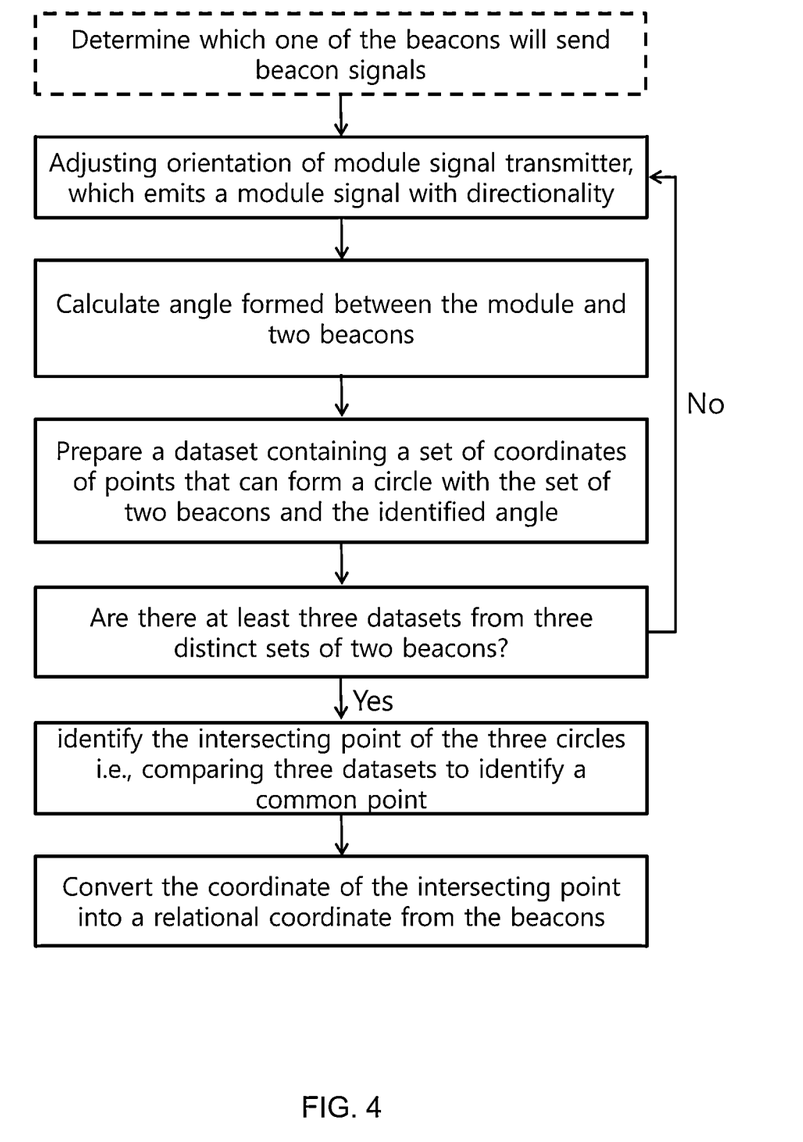
FIG. 4 is a flowchart illustrating a method of determining the position of the positioning module according to an embodiment of the present disclosure.

In some other embodiments of the present disclosure, the position of the positioning module 200 is identified by using the angle it forms relative to two beacons positioned at a predetermined locations. FIG. 4 is a flowchart representative of example machine-accessible instructions, which may be executed to identify the position of the positioning module 200 according to an embodiment of the present disclosure. Referring to FIG. 4, the positioning module 200 can be configured to scan the surrounding by emitting a module signal S2 with directionality. For instance, the scanning operation can be performed by the module signal transmitter 202 coupled to an actuator that rotates about the positioning module 200. In this embodiment, the module signal S2 emitted from the module signal transmitter 202 is a signal with directionality, meaning the module signal travels substantially in one directional path. By way of examples, the module signal S2 with directionality may be light signals, such as a laser beam or infrared signal. In one embodiment, a laser based module signal can be modulated such that it is emitted limited horizontal angle (e.g., +−1 degrees) but wide vertical angle (e.g., +−180 degrees). The module signal transmitter 204 can be configured to emit the module signal S2 while the module signal transmitter 204 is being rotated about the positioning module 200. When the module signal S2 is received by the module signal receiver 304 of a first beacon 300A, the beacon signal transmitter 302 of the first beacon 300A will be activated and transmit the beacon signal S3.

Unlike the previous example described in reference to FIGS. 3A and 3B, this embodiment of the positioning system 100 do not rely on the distances between the beacons 300 to the positioning module 200. Therefore, the beacon signal S3 emitted from each beacon 300 does not have to include two different types of signals, but can be a simple radio frequency signal. It is sufficient that the beacon signal from the first beacon 300A differs from the beacon signal from the second beacon 300B and the third beacon 300C, such that the positioning module can identify which beacon the beacon signal S3 originated from. By way of an example, the beacon signal S3 may be RFID signal that is unique to the beacon.

When the beacon signal S3 from the first beacon 300A is received at the beacon signal receiver 204 of the positioning module 200, the positioning module 200 will record the orientation of the module signal transmitter 202 that triggered return of the beacon signal from the first beacon 300A. For example, the module signal transmitter 202 may be coupled to a stepper motor that can rotate 360 degrees, and the positioning module 200 can be configured to record the degree of rotation of the stepper motor when the beacon signal S3 is received by the beacon signal receiver 204. The stepper motor may provide a predetermined number of steps in a single revolution. For instance, a stepper motor with 51,200 steps per revolution can be used. In this case, each step represents 0.007 degrees of accuracy. The module signal transmitter 204 continues to emit the module signal S2 while the module signal transmitter 204 is continually being rotated about the positioning module 200. When the module signal S2 emitted from the module signal transmitter 204 is received by the module signal receiver 304 of the second beacon 300B, the beacon signal transmitter 302 of the second beacon 300B is activated to transmit the beacon signal. When the beacon signal from the second beacon 300B is received at the beacon signal receiver 204 of the positioning module 200, the positioning module 200 will record the orientation of the module signal transmitter 202 that triggered return of the beacon signal from the second beacon 300B (e.g., degree of rotation of the stepper motor).

Figure 5:
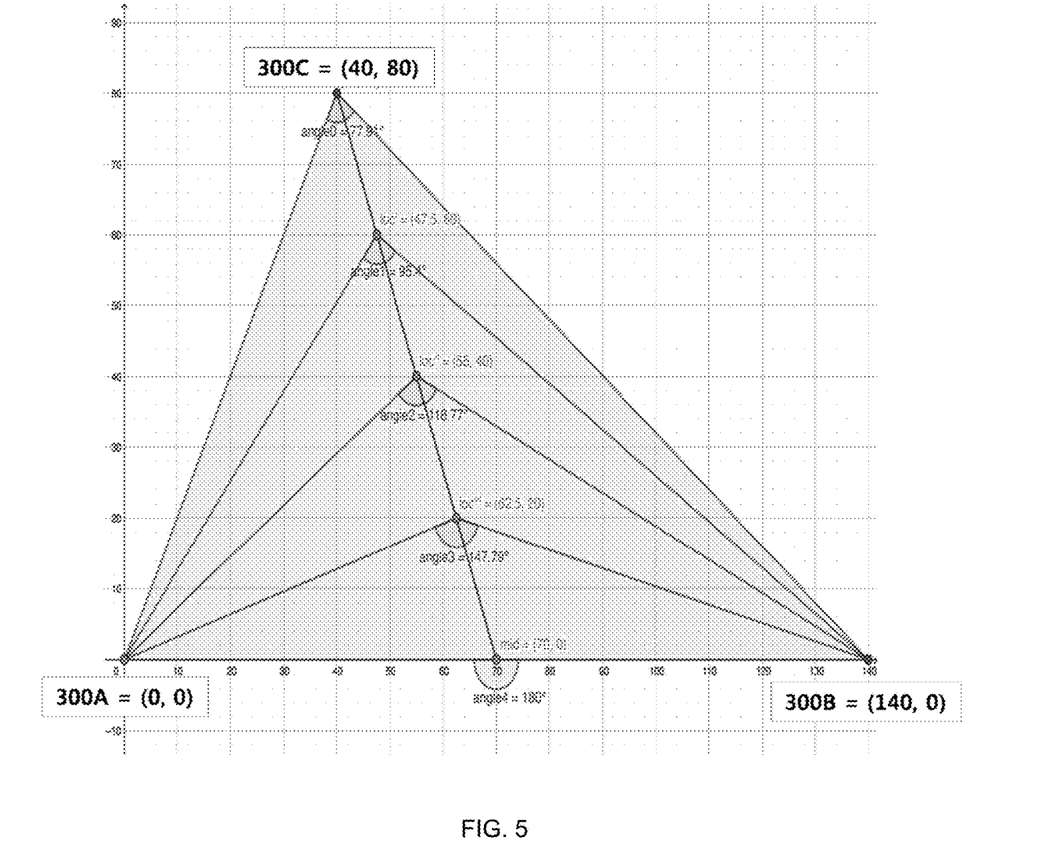
FIG. 5 is a schematic diagram illustrating a method of determining a possible position of the positioning module based on the angle formed at the positioning module between two beacons.

Based on the two recorded orientations of the module signal transmitter 204, the angle between the first beacon 300A and the second beacon 300B formed at the positioning module 200 can be identified. As noted before, the position of each of the beacons are fixed, and the coordinates of the beacons can be stored in a database. Referring to FIG. 5, the coordinate of the first beacon 300A can be set as (0, 0), and the coordinate of the second beacon 300B can be set as (140, 0), and the coordinate of the third beacon 300C can be set as (40, 80). In reference to the coordinates of the beacons 300A, 300B and 300C, a coordinate of a point which forms 95.4 degrees between the first beacon 300A and the second beacon 300B can be scaled or otherwise identified as (47.5, 60). Similarly, the coordinate of a point which forms 118.77 degrees between the first beacon 300A and the second beacon 300B can be scaled to or otherwise identified as (55, 40). Likewise, a coordinate of a point which forms 147.79 degrees between the first beacon 300A and the second beacon 300B can be scaled to or otherwise identified as (62.5, 20).

Figure 6A:
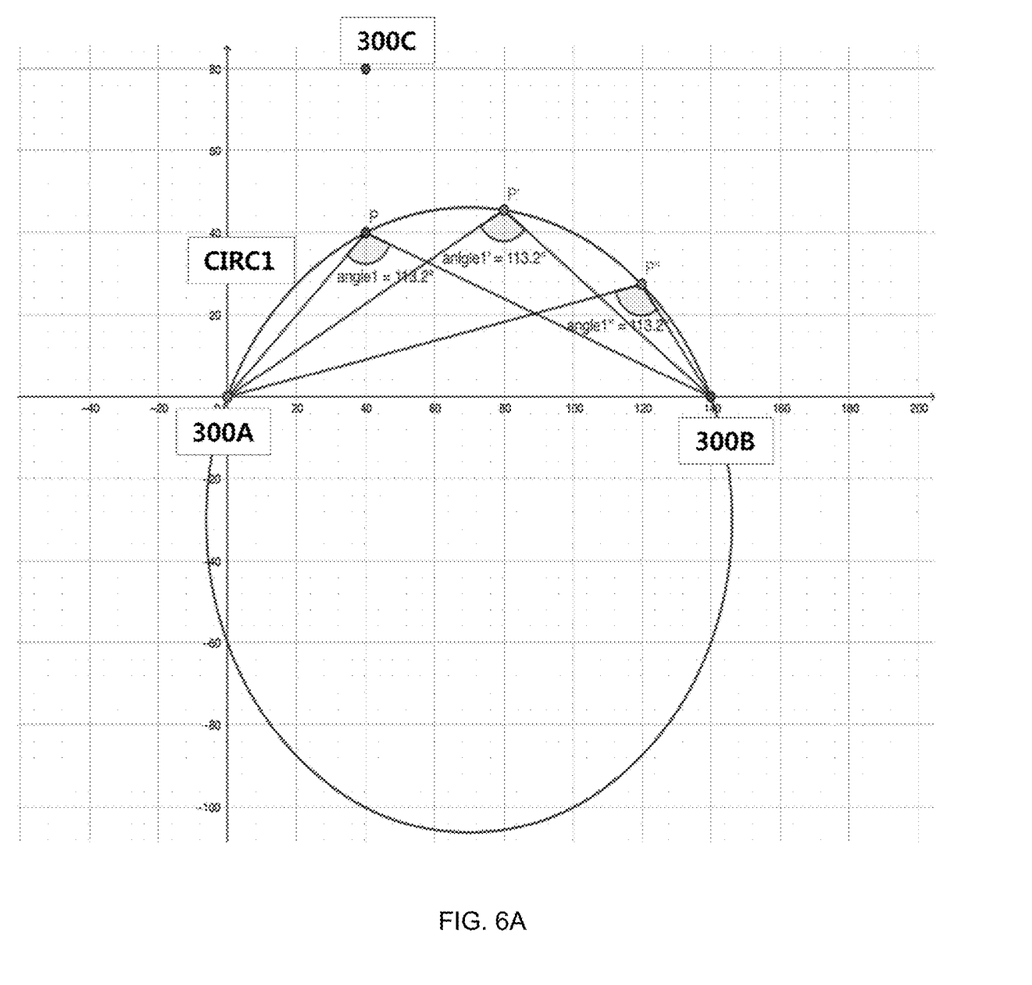
FIGS. 6A-6C are schematic diagrams illustrating a method of determining the position of the positioning module based on the angle formed at the positioning module between two beacons.

In the example depicted in FIG. 6A, the angle formed at the positioning module 200 (serving as a vertex) between the first beacon 300A and the second beacon 300B is 113.2 degrees. The first circle CIRC1 can be defined with three points, the first beacon 300A being the first point, the second beacon 300B being the second point, and any one point that forms 113.2 degrees between the first beacon 300A and the second beacon 300B being the third point. Here, the coordinates of the first beacon 300A and the second beacon 300B are already known as they are manually placed at the time of the installation. Based on the coordinates of the two beacons 300A/300B and the angle AG1 between those two beacons 300A/300B, possible set of coordinates of the positioning module 200 can be determined. As shown in FIG. 6A, the angle AG1 between the first beacon 300A and the second beacon 300B at the exemplary points P, P' and P" is 113.2 degrees. The coordinate of any one of those points (P, P' or P"), which forms 113.2 degrees may be pre-stored in a database (e.g., a look-up table). As shown in FIG. 6A, a circle CIRC1 can be defined with the first beacon 300A, the second beacon 300B and a point that forms 113.2 degrees between the first beacon 300A and the second beacon 300B. The coordinates of the points along the circle CIRC1 may be collected and prepared as a dataset (e.g., a hash-map, lookup table). All of the points that form 113.2 degrees between the first beacon 300A and the second beacon 300B are the potential candidate for the position of the positioning module 200.

Figure 6B:
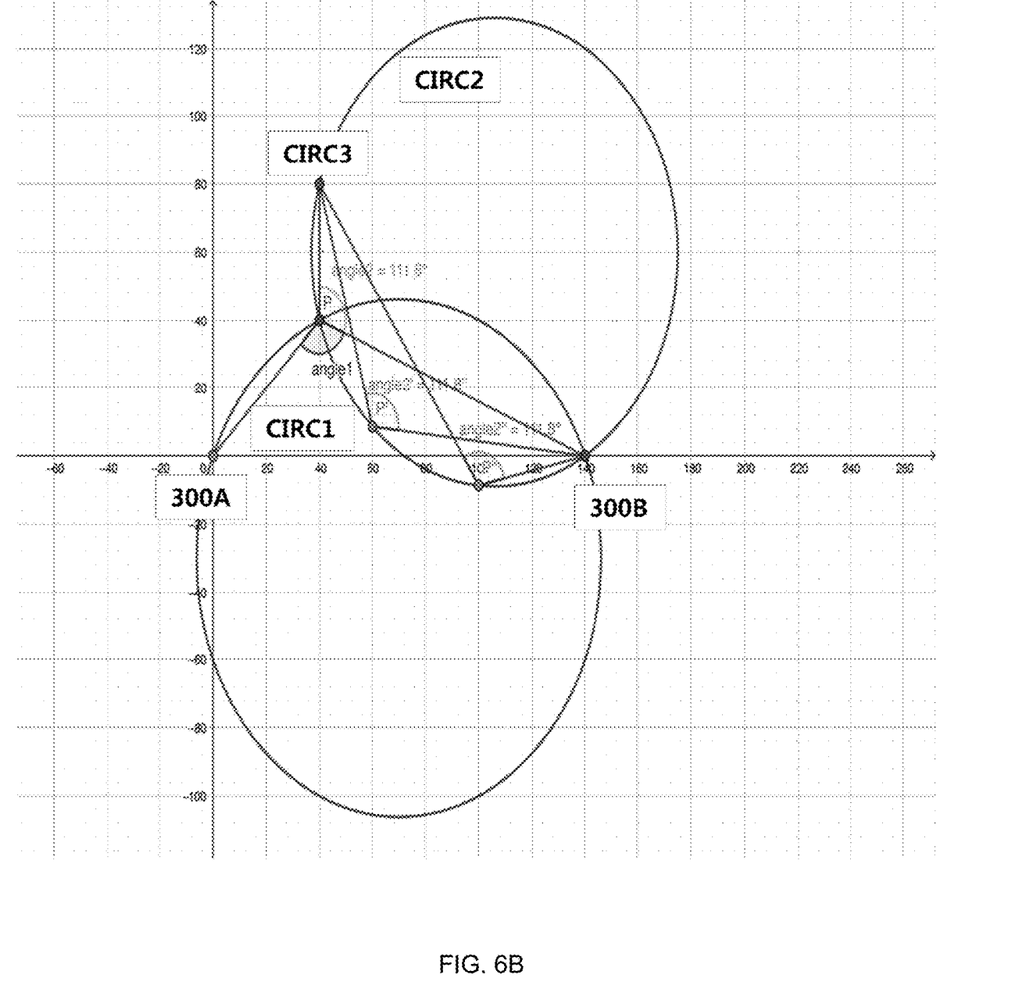

Referring to FIG. 6B, the module signal transmitter 202 of the positioning module 200 rotates further about the positioning module 200 while emitting the module signal S2. When the module signal S2 hits the module signal receiver 304 of the third beacon 300C, the beacon signal transmitter 302 of the third beacon 300C emits the beacon signal S3. When the beacon signal S3 from the third beacon 300C is received by the beacon signal receiver 204 of the positioning module 200, the orientation of the positioning module 200 recorded. In other words, the orientation of the actuator (e.g., rotation degree of a stepper motor), which triggered return of the bacon signal S3 from the third beacon 300C is recorded. With this information, the angle AG2 at the positioning module 200 between the second beacon 300B and the third beacon 300C can be identified. For instance, the rotation degree from the point where the beacon signal S3 is received from the second beacon 300B until the beacon signal S3 is received from the third beacon 300C can be determined as the angle AG2 between the second beacon 300B and the third beacon 300C. In the example depicted in FIG. 6B, the angle AG2 between the second beacon 300B and the third beacon 300C is shown as 111.8 degrees. The second circle CIRC2 can be defined with the three points, the second beacon 300B being the first point, the third beacon 300C being the second point, and any one point that forms 111.8 degrees between the second beacon 300B and the third beacon 300C being the third point. A set of coordinates for points that form 111.8 degrees between the second beacon 300B and the third beacon 300C can be prepared as a dataset. All of the points that form 111.8 degrees between the second beacon 300B and the third beacon 300C are the potential candidate for the position of the positioning module 200.

Figure 6C:
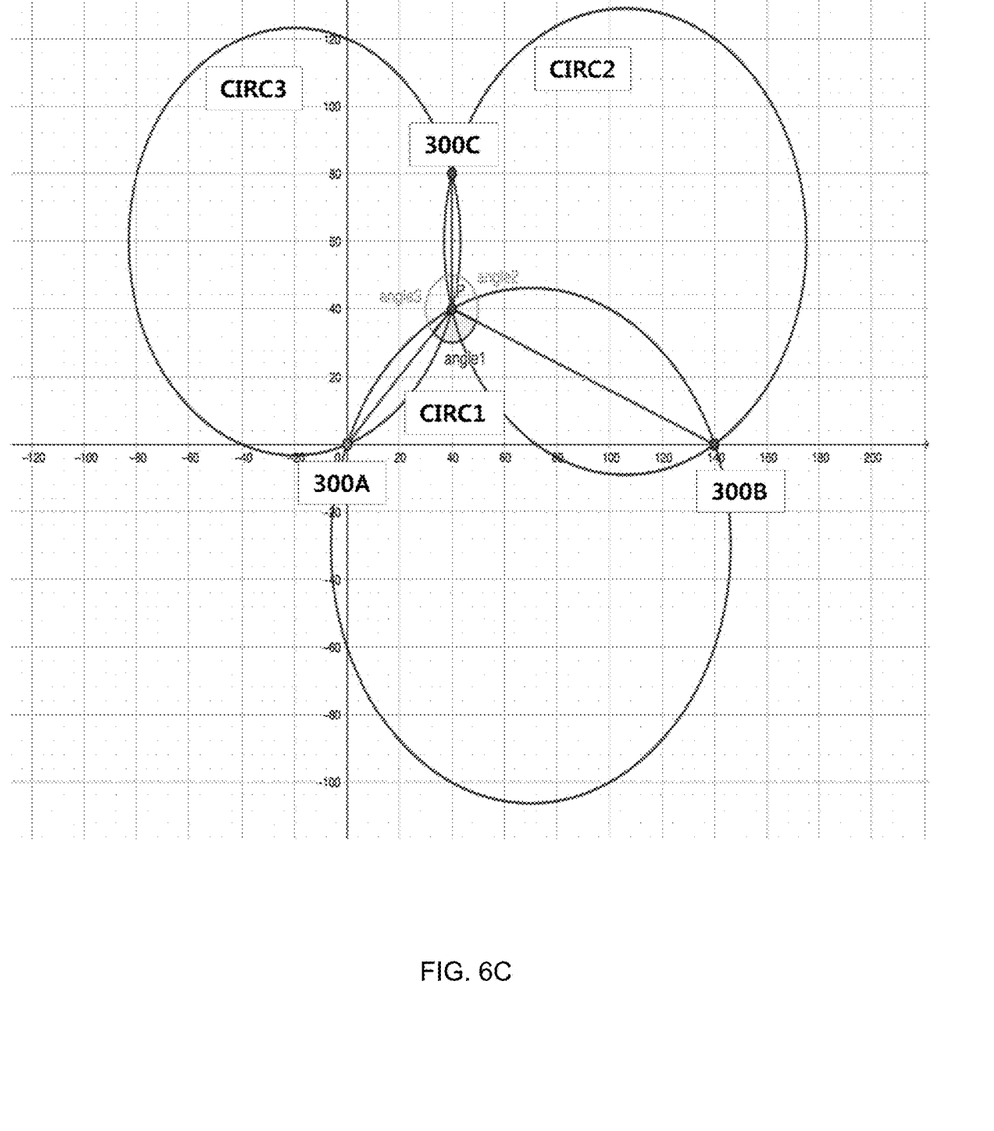

Referring to FIG. 6C, the angle AG3 formed at the positioning module 200 (serving as a vertex) between the first beacon 300A and the third beacon 300C can be identified as 135 degrees. Then the third circle CIRC3 can be defined with the foregoing three points, the first beacon 300A being the first point, the third beacon 300C being the second point, and any one point that forms 135 degrees between the first beacon 300A and the third beacon 300C being the third point. All of the points that form 135 degrees between the first beacon 300A and the third beacon 300C are the potential candidate for the position of the positioning module 200. The set of coordinates for those points that form 135 degrees between the second beacon 300B and the third beacon 300C can be prepared as a dataset. The exact position of the positioning module 200 can be identified when at least three circles are defined. The three circles CIRC1, CIRC2 and CIRC3 will intersect at one point, which will be the exact location of the positioning module 200. In other words, the dataset comprising the set of coordinates of the points forming 113.2 degrees between the first beacon 300A and the second beacon 300B, the dataset comprising the coordinates of the points forming 111.8 degrees between the second beacon 300B and the third beacon 300C, and the dataset comprising the set of coordinates forming 135 degrees between the first beacon 300A and the third beacon 300C are compared to identify the coordinate of the point that exist in all of those datasets.

As noted before, the beacons 300 are installed at a fixed location and are surveyed precisely. The coordinates of the beacons can be represented in positive integer values as in FIG. 5. However, the external coordinates of the beacons 300 may also be stored in a database along with the internal coordinates (positive integer coordinate values). Based on the pre-stored longitude/latitude position of the beacons, the longitude/latitude coordinates of the positioning module 200 can also be identified. By way of example, each of the beacons 300A—300D may have the external coordinate (longitude, latitude) as shown in FIG. 7.

Figure 7:
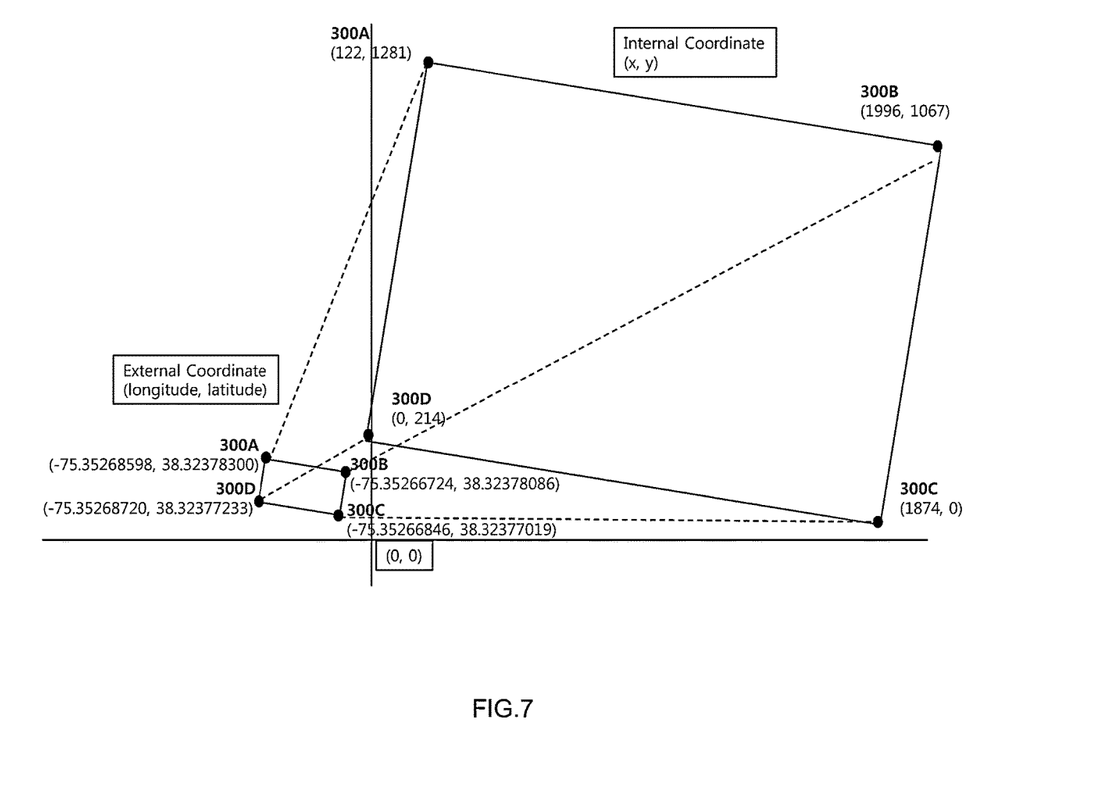
FIG. 7 is a schematic diagram illustrating exemplary conversion between external coordinates and internal (positive integer value) coordinates.

In FIG. 7, the first beacon 300A has the external coordinate of (−75.35268598, 38.32378300), the second beacon 300B has the external coordinate of (−75.35266724, 38.32378086), the third beacon 300C has the external coordinate of (−75.35266846, 38.32377019), and the fourth beacon 300D has the external coordinate of (−75.35268720, 38.32377233). The minimum longitude value −75.35266724 of the fourth beacon 300D and the minimum latitude value 38.32377019 of the third beacon 300C can be used as the conversion rate. Using the conversion rate, the external coordinate of the first beacon 300A (−75.35268598, 38.32378300) can be converted into an internal coordinate of (122, 1281) by subtracting the conversion rate (−75.35266724, 38.32377019) from the external coordinate, then multiplied by 100,000,000. With the current position information of the positional module 200, the movable object OBJ coupled to the positional module 200 can be maneuvered to the destination or perform a predetermined operation when the movable object OBJ is at a predetermined location.

It should be noted that the method for self-positioning within a limited area may simultaneously or sequentially use a combination of distance based positioning method described in reference to FIG. 3A and the angle based positioning method described in reference to FIG. 4A to determine a specific location, orientation, and movement of a moveable object OBJ within a limited area or space. In such embodiments, the positioning module 200 may be coupled to an actuator for adjusting the orientation of the module signal transmitter, which is configured to emit a module signal S2 with directionality described above. The beacons 300 may be equipped with beacon signal transmitters 302 that is capable of at least two different types of beacon signals S3 for identifying the distance between the beacon 300 and the positioning module 200 based on the time of arrival difference between the two different types of the beacon signals S3. Accordingly, the processor 400 can be configured to identify the position of the positioning module 200 using the distance based method as well as the angle based method for higher accuracy.

Foregoing instructions and the various data described herein for various applications may be stored in files and transmitted using a variety of computer-readable media. A file in a computing device is generally a collection of data stored on a computer readable medium, such as a storage medium, a random access memory and the likes.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

What is claimed is:

1. A method of facilitating a limited area positioning system, comprising:

emitting a module signal that propagates substantially in a straight line path from a module signal transmitter, in a predetermined rotational steps about an axis around a positioning module by adjusting a stepper motor coupled to the module signal transmitter;

emitting a beacon signal from a beacon when said beacon receives the module signal emitted from the module signal transmitter;

recording the stepper motor's first rotational degree, second rotational degree and third rotational degree upon receiving the beacon signal from the first beacon, the second beacon and the third beacon, respectively, to obtain a first angle formed at the positioning module between the first beacon and the second beacon, a second angle formed at the positioning module between the first beacon and the third beacon, and a third angle formed at the positioning module between the second beacon and the third beacon;

preparing three datasets, each dataset containing a set of coordinates of points of a circle defined by coordinates of the two beacons among said three beacons and the obtained angle between said two beacons; and comparing the three datasets to identify a coordinate of a point that exists in all of the three datasets as a current position of the positional module.

2. The method of claim 1 further comprising a step for converting the identified coordinate of the point that exist in all of the three datasets into a relational coordinate of the positioning module associated with said three beacons.

3. The method of claim 1, wherein the module signal is one of a laser signal and an infrared signal.

4. The method of claim 1, wherein the beacon signal is one of an electromagnetic signal and an acoustic signal.

5. The method of claim 4, wherein the beacon signal is radio frequency identification (RFID) signal that is unique to the beacon emitting said beacon signal.

\* \* \* \* \*